United States Patent Office 3,232,889
Patented Feb. 1, 1966

3,232,889
SUPPORTED COPPER CHLORIDE CATALYST AND ITS PREPARATION
Harold E. Bellis, North Tonawanda, N.Y., assignor to E. I. du Pont de Nemours and Company, Wilmington, Del., a corporation of Delaware
No Drawing. Filed Mar. 2, 1961, Ser. No. 92,790
8 Claims. (Cl. 252—441)

This invention relates to a novel fluid catalyst composition for use in a one-stage process for the oxychlorination of aliphatic hydrocarbons and their partially chlorinated derivatives containing replaceable hydrogen atoms.

DEFINITION OF TERMS

The term "fluid catalyst composition," refers to a finely divided solid composition capable of operating in the so-called fluid or boiling bed. Compositions of the type under consideration comprise a combination of substantially inert or non-catalytic support particles and catalytic salts.

The term "oxychlorination" refers to chlorination reactions in which the source of all or part of the chlorine in the chlorinated products obtained is hydrogen chloride. Hydrogen chloride acts as a chlorinating agent by virtue of a reaction or series of reactions involving oxygen and a catalyst containing a metal of variable valence, preferably a chloride of copper. The term "chloride of copper" or "copper chloride" as employed herein means cupric chloride or any combination of copper chloride substances (e.g., cupric chloride, cupric oxychloride and cuprous chloride) produced when cupric chloride functions as an oxychlorination catalyst alone or in admixture with an alkali metal chloride.

By a "one-stage oxychlorination process" is meant a process in which hydrogen chloride, oxygen and the hydrocarbon or chlorohydrocarbon, which is to be chlorinated, are brought together in the presence of the catalyst in a reaction zone wherein the desired chlorination takes place. This includes reactions in which hydrogen chloride utilized for the oxychlorination is produced in the reaction zone from chlorine by a primary hydrocarbon chlorination as indicated by the following equation in which RH represents a hydrocarbon or chlorohydrocarbon containing at least one replaceable hydrogen atom:

(1) $\quad RH + Cl_2 = RCl + HCl$

The "one-stage process" is to be differentiated from multi-stage prior art processes. In the latter, for example, a hydrocarbon or a partially chlorinated hydrocarbon is chlorinated by reaction with cupric chloride or cupric oxychloride and hydrogen chloride as shown below:

(2) $\quad RH + 2CuCl_2 = RCl + HCl + Cu_2Cl_2$
(3) $\quad RH + HCl + CuO.CuCl_2 = RCl + H_2O + Cu_2Cl_2$ In these processes, the copper salts act as chlorine or oxygen carriers and the chlorination reactions shown above are part of a cycle including the oxidation of cuprous chloride to cupric oxychloride.

(4) $\quad Cu_2Cl_2 + \frac{1}{2}O_2 = CuO.CuCl_2$

The hydrocarbon chlorination stage (Equation 2 or 3) is usually carried out in the absence of air. Whereas the conversion of cuprous chloride to cupric oxychloride (Equation 4) is carried out with air in a separate reactor. This oxychloride may then be reacted with hydrogen chloride and the compound to be chlorinated (Equation 3) or separately converted to cupric chloride by reaction with hydrogen chloride:

(5) $\quad CuO.CuCl_2 + 2HCl = 2CuCl_2 + H_2O$

The cupric chloride produced in Equation 5 may then be used in chlorination Equation 2. The process involving separate conversion of cupric oxychloride to cupric chloride requires three reactors whereas only two reactors are required when the chlorination is carried out with cupric oxychloride and hydrogen chloride.

PRIOR ART

The one-stage oxychlorination process has been employed in the prior art using supported copper chloride in stationary catalyst beds. However, the highly exothermic nature of the chlorination makes control difficult under these circumstances. As a result, special techniques for temperature regulation are required. The elimination of hot spots in the stationary catalyst bed is particularly difficult. These control problems have been solved in some instances by the use of specially designed reactors, heat exchangers, etc. The use of the previously described multi-stage oxychlorination processes with fluid or moving beds offers another method of temperature control since it makes it possible to spread heat evolution over two or three reactors.

A simple one-stage process for the oxychlorination of aliphatic hydrocarbons employing a fluid bed and copper chloride catalysts has not been disclosed in the prior art. Joseph, U.S. Patent 2,752,401 (June 26, 1956), teaches that "a fluidized reaction mass is necessarily of uniform composition throughout each reaction zone and that the use of such a mass, where the reagents normally pass through several stages, results necessarily in average or compromise conditions rather than optimum reaction conditions" (column 1, lines 45–50). In this connection, it is also stated that "many of the chlorinated hydrocarbons which it is desired to produce by an oxychlorination procedure, are readily hydrolyzed by water at high temperatures while the same compounds, or the hydrocarbons from which they are made, are oxidized to carbon dioxide by such agents as cupric oxychloride or oxygen at high temperatures" (column 2, lines 6 to 12).

The one-stage oxychlorination of a saturated aliphatic hydrocarbon, such as methane, proceeds best at temperatures ranging from about 375° to 600° C. in contrast to the oxychlorination of aromatic hydrocarbons, e.g., benzene, which proceed readily at lower temperatures as noted by Fontana et al., U.S. Patent 2,575,167 (Nov. 13, 1951), column 1, lines 46–54. Loeser et al., U.S. Patent 2,827,502 (Mar. 18, 1958), describes a one-stage oxychlorination process for benzene in which the reaction takes place at 190–210° C. in a fluidized bed containing copper hydroxide on an alumina support.

One-stage oxychlorination processes employing a copper chloride catalyst suffer serious disadvantages because of the volatility of this catalyst when high tempeartures are required. The volatility of copper chloride constitutes a particularly serious problem when the catalyst is employed in the range 375–600° C. in the finely divided state necessitated by a fluid bed. This situation is further exacerbated by the large volume of air or oxygen-containing gases used in a one-stage oxychlorination. This situation has been ameliorated in some instances by the use of a less volatile copper compound such as copper silicate (Reynolds, U.S. Patent 2,783,286 (Feb. 26, 1957)). Special techniques employed in the oxidation of hydrogen chloride to chlorine involve scrubbing the copper chloride catalyst from the product gases with water and returning the extract to the hot catalyst in the reactor. This is illustrated by Davis et al., U.S. Patent 2,547,928 (Apr. 10, 1951). In spite of these faults, copper chloride is recognized as one of the most effective oxychlorination catalysts. The volatility of copper chloride can be reduced by admixture with alkali metal halides, preferably sodium or potassium halides. Such combinations are satisfactory for use on catalyst supports in stationary beds. However, we have found that these mixtures of copper chloride and alkali metal chlorides are often fatally defective for use on finely divided supports in fluid beds that must be operated in the range 375° to 600° C. Such beds tend to agglomerate in use whenever the catalyst salt concentration is sufficiently high to produce a good rate of oxychlorination. This is particularly the case when a satisfactorily inert support having a good resistance to attrition is emloyed. Many well-known and allegedly inert support materials catalyze decomposition and oxidation of hydrocarbons and chlorohydrocarbons at temperatures in the 375°–600° C. range.

OBJECTIVES

It is an object of this invention to provide a non-agglomerating fluid catalyst composition comprising a mixture of copper chloride and an alkali metal chloride on an inert support for the one-stage oxychlorination of aliphatic hydrocarbons and their partially chlorinated derivatives. It is another object to provide a non-agglomerating oxychlorination catalyst which will give good chlorination rates and a highly efficient utilization of hydrogen chloride. It is a further object to supply a catalyst composition comprising calcined diatomaceous earth support particles and a mixture of catalytic salts comprising copper chloride and alkali metal chlorides in which the catalytic salt composition migrates from particle to particles without agglomerating or causing agglomeration of the support so that substantially uniform distribution of the catalytic salts is constantly maintained on the support particles. A still further object is to provide a fluid catalyst composition for oxychlorination reactions consisting of particles of a calcined diatomaceous earth on which surface there is a substantially uniform distribution of small patches or islets of a catalytic salt composition produced by the combination of copper cholride and potassium or sodium chloride. Additional objects are to provide means for preparing the fluid catalyst of this invention and employing it in the oxychlorination of aliphatic hydrocarbons and their partially chlorinated derivatives. Other objects and advantages of the invention will become apparent from the following detailed description thereof.

INVENTION

The fluid oxychlorination catalyst composition of this invention comprises a calcined diatomaceous earth support on whose surface there is a substantially uniform distribution of small patches of a catalytic salt mixture consisting of copper chloride and alkali metal chloride, the latter being preferably sodium or potassium chloride. Examination of catalyst particles under the microscope shows that with the exception of the orange irregular globule-like particles or islets of catalytic salts on the support surface, the uncovered support surface is not colored by these salts. Furthermore, when the catalyst-bearing articles are broken there is no apparent coloration in the interior of these particles. In other words, it is obvious that the support is not uniformly impregnated with catalytic salts and resembles untreated support except for the sharply limited patches of salts on the surface of the particles. Even when applied to the support by solution impregnation and drying, these salts segregate to form the characteristic surface patches when the catalyst is submitted to hot fluidization as the critical step in its pepraration.

The catalyst composition is also characterized by the fact that it will fluidize without agglomeration in the range 375° to 600° C. as long as the total salt content is less than about 45% of the weight of the total catalyst composition. This fluid catalyst composition is unique in that when maintained in the fluidized state at operating temperatures the catalytic salt mixture on the support particles migrates from particle to particle without causing agglomeration of these particles and produces and maintains a substantially uniform distribution of the catalytic salt patches on the individual particles. This characteristic distribution takes place even when the initial catalyst distribution is far from uniform. For example, when support particles free of the catalytic salt mixture are added to a hot fluidized bed of the catalyst composition of this invention, the distribution of salt patches on all particle surfaces becomes substantially uniform in 3 to 6 hours. In the same manner, the addition of fresh catalyst composition bearing a higher salt concentration than that of the hot fluidized bed is also followed by migration of catalytic salts to produce a substantially uniform composition. Furthermore, the substantially dry catalysic salt mixture can be added to the hot fluid catalyst composition or the pure hot fluidized support to produce a uniform fluid catalyst composition by migration of the salts onto the support particles. The migration of the presumably molten or semi-liquid catalyst salts in the hot fluid catalyst bed facilitates catalyst preparation and control of the oxychlorination reaction by insuring uniformity of the catalyst bed. That this migration of catalytic salt can take place without agglomerating or causing agglomeration of the support is surprising and would not be expected from the teachings of the prior art.

The catalytic salt composition in the fluid catalyst of this invention normally contains copper chloride and sodium or potassium chloride in such proportion that the alkali metal halide content of the salt mixture ranges from 20 to 70 mole percent, preferably 25 to 66 mole percent. The catalytic salt content of the fluid catalyst preferably ranges from 10 to about 40% by weight. Particle sizes of the fluid catalyst range from 30 to 300 mesh, preferably 35 to 80 mesh (U.S. mesh sizes). The calcined diatomaceous earth support preferably contains a clay binder, essentially an aluminum silicate, congruent with an alumina content of 4 to 10%. All diatomaceous earths contain some clay, the amount present being a function of the alumina content which is normally in the range of approximately 3½ to 5%. Suitable diatomaceous earth supports include the catalyst carriers manufactured by the Johns-Manville Products Company known as Type V "Celite" catalyst carrier and Type VIII "Celite" catalyst carrier. The preferred support for the catalyst of this invention is the Type V "Celite."

The supported catalyst of this invention is produced by heating a mixture of calcined diatomaceous earth support and catalytic salts, consisting essentially of cupric chloride and sodium or potassium chloride in the fluidized state at a temperature of 375 to 600° C. for at least three hours. The mixture is maintained in the fluidized state by a stream of gas containing oxygen and a chlorinating agent such as chlorine or hydrogen chloride. The exact constitution of this gas is not critical. Preferably, however, it should contain the aforesaid ingredients. For example, a mixture of four to five volumes of air and one volume of chlorine may be employed for this purpose. A gaseous oxychlorination mixture is also satisfactory. Such a mixture may contain chlorine and/or hydrogen chloride, oxygen, nitrogen, and aliphatic hydrocarbons and/or their partially chlorinated derivatives.

The total amount of salts in the mixture used for catalyst preparation should not exceed 45% by weight. However, preferred salt concentrations lie in the range 10 to 40% anhydrous salts. As previously noted the alkali halide content of this salt mixture should lie in the range 20 to 70 mole percent and preferably 25 to 66 mole percent. The mixture used for catalyst preparation may be prepared by treating the support mixture with an aqueous solution of cupric chloride and potassium chloride and drying the resultant composition or by preparing a mixture of support particles and powdered salts. Hot fluidization in a gas stream is essential to obtain the desired catalyst composition. For example, as previously indicated the catalyst can be prepared by subjecting the support to fluidization in the 375° to 600° C. range and gradually adding a mixture of solid cupric chloride and potassium chloride. Some adherence of catalyst to the reactor wall may take place initially but the mixture soon becomes homogeneous and presents the characteristic appearance of the catalyst when viewed under the microscope. Additional catalyst can be prepared during an oxychlorination process by adding dried salt impregnated catalyst to the hot fluid bed or by adding salt-free support. In either case, the unique migration of catalytic salt from particle to particle soon gives a uniform distribution of salt patches over all the support particles. This phenomenon is of special value in obtaining a substantially uniform catalytic salt content throughout the fluid bed.

Heating dried calcined diatomaceous earth, after impregnation with an aqueous solution of the catalytic salts, in a gaseous mixture of air and chlorine at 375° to 600° C. in a tubular reactor without fluidization in a stationary bed does not give the characteristic catalyst of this invention. After 6 hours, heating at 440° C., catalyst prepared in this way was found to consist of uniformly coated particles with a fuzzy dark orange layer of salts.

The characteristics of the highly effective fluid oxychlorination catalyst of this invention are dependent on the combination of the finely divided calcined diatomaceous earth support and the catalytic mixture of copper chloride and alkali metal chlorides. Similar catalysts utilizing other supports and containing 10 to about 40% of the copper chloride-potassium chloride mixture have been found unsatisfactory for the chlorination of aliphatic hydrocarbons or their partially chlorinated derivatives for one or all of the following reasons:

(1) Catalyst agglomeration.
(2) Excessive attrition of catalyst particles.
(3) Excessive decomposition or oxidation of hydrocarbons or chlorohydrocarbon products.

Unsatisfactory supports that are non-operative due to agglomeration include pumice, broken fire brick, Alundum, sand, low surface area silica gel and a flux calcined diatomaceous earth known commercially as "Celite" IX. Fire brick and pumice particles are also unsatisfactory because they are too soft and turn to powder due to attrition on use in the fluid bed. Large surface area supports, such as silica gel and alumina in which the surface area is over 12 m.$^2$/g. do not agglomerate but cause excessive decomposition.

Catalysts prepared with the preferred concentrations of copper chloride and alkali metal chloride but employing supports other than calcined diatomaceous earth do not show the unique physical structure characteristic of the catalysts of this invention following fluidization in the 375° to 600° C. temperature range when such fluidization is possible without appreciable agglomeration. The above-mentioned appear to be uniformly impregnated with the catalytic salts. They retain their original form although colored by the salts. They do not show the surface distribution of colored salt patches characteristic of the new catalyst.

Fluid catalysts prepared with calcined diatomaceous earth supports by the process of this invention but with little or no alkali metal chloride are unsatisfactory. They do not show the characteristic appearance of the catalyst of this invention. Furthermore, reactions carried out with such fluid catalysts are extremely difficult to control unless special techniques are employed for the return of copper chloride to the support. Such processes also require special equipment for recycling catalyst.

Oxychlorinations are carried out with the catalyst of this invention by following the ordinary fluid bed catalytic reaction technique. The reaction may be carried out in any type of reactor which will allow intimate contact of the reactant gases with the fluid catalyst. Hydrogen chloride, oxygen or an oxygen-containing gas and the product to be chlorinated are fed into the fluid reactor at a rate sufficient to maintain the fluid bed without appreciable loss of catalyst by entrainment in the product off-gases. A cyclone should be sufficient to return substantially all entrained catalyst to the reactor. The reaction is preferably carried out with air or oxygen using a glass refractory or brick-lined reactor. The extent of conversion is controlled by regulating temperature, the proportion of raw materials used and the catalyst. Catalyst control relates to the depth of the fluid bed and the concentration of the catalytic salts.

The oxychlorination catalyst and process of this invention may be readily adapted to the chlorination of a variety of aliphatic hydrocarbons or their chlorinated derivatives. Appropriate raw materials include methane, ethane, propane, propylene, butane, methyl chloride, ethyl chloride, dichloroethanes, etc.

The following examples illustrate the preparation and use of the catalyst of this invention but are not to be construed as limiting the invention.

*Example 1*

A solution of 7.5 g. potassium chloride and 19 g. cupric chloride (CuCl$_2$.2H$_2$O) in 127 g. water was intimately mixed with 77.5 g. of the calcined diatomaceous earth "Celite" No. V having a particle size in the range 35 to 80 mesh. This material contains a clay binder and has an alumina content of 4.4% by weight. The resultant mixture was air-dried at room temperature for about 18 hours, and subsequently oven-dried at 250° C. for 24 hours. The resultant material contained approximately 15% cupric chloride and 7.5% potassium chloride. On microscopic examination, the particles were found to be uniformly coated with salts and were a light tan in color. The catalyst particles were then subjected to fluidization in a gaseous current of a mixture of about 4 to 5 volumes of air per one volume of chlorine for about 6 hours at a temperature of 440° C. Examination of the resultant catalyst under the microscope showed that the catalytic salts were congregated in small orange patches or islets which were substantially uniformly distributed on the surface of the support particles.

*Example 2*

A 77.5 g. charge of crushed extruded pellets of "Celite" VIII calcined diatomaceous earth having a particle size in the range 35 to 80 mesh was converted to catalyst by the procedure of Example 1. This support contains clay binder and has an alumina content of 6.4%. The appearance of the finished catalyst after hot fluidization was similar to that of Example 1 except that the orange color of the catalyst salt patches was darker than that in the catalyst of Example 1.

*Example 3*

A charge of 31 g. of the 35–80 mesh particles of calcined diatomaceous earth, "Celite" V, was placed in a one inch diameter glass tube having a length of 30 inches and fluidized in an air-chlorine gas mixture at a temperature of 440° C. A powdered mixture of 7.45 g. cupric chloride ($CuCl_2 \cdot 2H_2O$) and 2.94 g. potassium chloride was gradually poured onto the top of the hot fluid bed of catalyst support. After approximately 4 hours, during which the hot bed was maintained in the fluid state, the catalyst particles were withdrawn and examined under the microscope. The catalytic salts were now substantially uniformly distributed on the surface of the support particles as orange patches or islets.

*Example 4*

A gaseous mixture containing nitrogen, methane, oxygen and anhydrous hydrogen chloride in the mole ratio of 3.0/0.5/0.9/1.0 was subjected to an oxychlorination reaction in the presence of fluid catalyst prepared in the manner described in Example 1. The reaction was carried out in a glass tube 2.5 inches in diameter and eight feet high. Feed rates were such that the combined gases entered the reactor at the rate of 22.5 liters per minute S.T.P. The catalyst charge was 1000 g. which fluidized to a height of about 4 feet in the reaction zone which was maintained at a temperature of 437° C. Contact time of the reaction gases with the catalyst was computed to be 4.1 seconds. The effluent gas was passed through a cyclone separator to remove entrained catalyst, subjected to counter-current scrubbing with water and dried over calcium sulfate (commercial "Drierite") and cooled. Chlorinated hydrocarbons were separated from the gas stream by condensation at −78° C. Product distribution in mole percent was 13% methyl chloride, 21% methylene chloride, 36% chloroform and 30% carbon tetrachloride. Conversion of anhydrous hydrogen chloride to chlorinated hydrocarbons was 90 mole percent. Conversion of methane to chlorinated hydrocarbons and carbon oxides (CO and $CO_2$) was 60 and 22 mole percent respectively. Methane recovered unreacted was 16 mole percent. Space time yield was 115 lbs. of chloroform and carbon tetrachloride per cubic foot of fluidized catalyst per day.

*Example 5*

In a combination chlorination-oxychlorination reaction otherwise similar to that of Example 4, nitrogen, methane, oxygen and chlorine were combined in the mole ratio of 4.8/1.1/2.2/1.0 and fed into the reactor at the rate of 19.6 liters per minute S.T.P. The catalyst bed was maintained at a temperature of 440° C. and the contact time was computed to be 5.1 seconds. Product distribution in mole percent was 12% methyl chloride, 19% methylene chloride, 32% chloroform and 37% carbon tetrachloride. Conversion of chlorine to chlorinated hydrocarbons was 94 mole percent. Conversion of methane to chlorinated hydrocarbons and carbon oxides was 58 and 28 mole percent respectively. Methane recovered unreacted was 7 mole percent. Space time yield was 122 lbs. of chloroform and carbon tetrachloride per cubic foot of fluidized catalyst per day. In this experiment, hydrogen chloride produced in the chlorination was utilized in the oxychlorination process.

*Example 6*

An oxychlorination reaction similar to that of Example 4 was carried out with catalyst similar to that prepared in Example 1 but containing 22% of the catalytic salt mixture (cupric chloride and potassium chloride) on the "Celite" V calcined diatomaceous earth support. Sufficient uncatalyzed "Celite" V calcined diatomaceous earth support was then added so that the ratio of fluidized catalyst to uncatalyzed support particles was approximately 3 to 1. The fluid catalyst reactor was then operated at a bed temperature of 445° C. for 3.75 hours. The catalyst charge was then withdrawn and examined under the microscope. As a result of this treatment all the support particles were found to be substantially uniformly covered on their surfaces with orange patches or islets of orange salts. The total fluid catalyst thus contained approximately 16% by weight of salts uniformly distributed throughout the individual particles of support.

*Example 7*

A gaseous mixture containing nitrogen, oxygen, anhydrous hydrogen chloride and ethylene dichloride in the mole ratio 3.4/1.1/1.2/1.0 was oxychlorinated as in Example 4 at a temperature 450° C. and a calculated contact time of 7.9 seconds. The depth of fluidized bed in this experiment was approximately 5 feet. Approximately 89% of the ethylene dichloride was converted into other chlorinated products comprising 43 mole percent trichloroethylene and 13 mole percent perchloroethylene as the major products. Conversion to carbon oxides was 7 mole percent.

The embodiments of the invention in which an exclusive property or privilege is claimed are defined as follows:

1. A fluid catalyst consisting essentially of particles of calcined diatomaceous earth having a mesh size in the range 30 to 300 mesh, on whose surface there is a substantially uniform distribution of small patches of a catalytic material consisting essentially of copper chloride and an alkali metal chloride selected from the group consisting of potassium chloride and sodium chloride.

2. The fluid catalyst composition of claim 1 in which the concentration of the catalytic material is equivalent to not more than about 45% by weight of the said composition and in which the said catalytic material contains 20 to 70 mole percent of alkali metal chloride, the balance consisting essentially of copper chloride.

3. The fluid catalyst composition of claim 2 in which the calcined diatomaceous earth contains a clay binder congruent with an alumina content in the range 4 to 10% by weight.

4. The fluid catalyst composition of claim 3 in which the particles of calcined diatomaceous earth have a mesh size in the range of 35 to 80 mesh.

5. A fluid catalyst composition capable of operating without agglomeration at temperatures in the range 375° to 600° C. for the one-stage oxychlorination of aliphatic hydrocarbons and their partially chlorinated derivatives, said fluid catalyst consisting essentially of particles of a calcined diatomaceous earth support containing a clay binder congruent with an alumina content in the range 4 to 10% by weight and having a U.S. mesh size in the range 35 to 80 mesh and on the surface of said diatomaceous earth particles a substantially uniform distribution of small patches of a catalytic material consisting essentially of copper chloride and an alkali metal chloride, selected from the group consisting of potassium chloride and sodium chloride, in which catalytic material the alkali metal chloride is present to the extent of 25 to 66 mole percent, said fluid catalyst composition containing from 10 to about 40% by weight of the said catalytic material.

6. Method for the preparation of a fluid oxychlorination catalyst capable of operating without agglomeration in the range 375° to 600° C. comprising heating in the fluidized state for at least three hours in the temperature range 375° to 600° C., a mixture consisting of particles of calcined diatomaceous earth having a mesh size in the range 30 to 300 and salts consisting essentially of cupric chloride and an alkali metal chloride, selected from the group consisting of sodium chloride and potassium chloride, in which said alkali metal chloride is present to the extent of 20 to 70 mole percent of said salts, said salts being present in said mixture to the extent of not more than about 40% by weight, said mixture being maintained in the fluid state by passage therethrough of a gas consisting essentially of oxygen and a chlorinating agent selected from the group consisting of chlorine and hydrogen chloride.

7. Method of claim 6 in which the calcined diatomaceous earth contains a clay binder congruent with an alumina content of 4 to 10% by weight and consists of particles having a mesh size in the range 35 to 80.

8. Method of claim 6 in which the fluidizing gas is a gaseous oxychlorination reaction mixture consisting of oxygen, nitrogen, a chlorinating agent selected from the group consisting of chlorine and hydrogen chloride and a material to be chlorinated selected from the group consisting of aliphatic hydrocarbons and their partially chlorinated derivatives.

References Cited by the Examiner

UNITED STATES PATENTS

| | | | |
|---|---|---|---|
| 2,952,714 | 9/1960 | Milam et al. | 260—659 X |
| 2,957,924 | 10/1960 | Heiskell et al. | 260—659 X |

MAURICE A. BRINDISI, *Primary Examiner.*

JULIUS GREENWALD, *Examiner.*